(12) United States Patent
Lones

(10) Patent No.: US 8,898,913 B1
(45) Date of Patent: Dec. 2, 2014

(54) MASONRY CIRCULAR SAW STABILIZING AND SUPPORTING SHOE

(71) Applicant: Michael J. Lones, Zanesville, OH (US)

(72) Inventor: Michael J. Lones, Zanesville, OH (US)

(*) Notice: Subject to any disclaimer, the term of this patent is extended or adjusted under 35 U.S.C. 154(b) by 0 days.

(21) Appl. No.: 14/306,358

(22) Filed: Jun. 17, 2014

(51) Int. Cl.
*B23D 47/02* (2006.01)

(52) U.S. Cl.
USPC .................. 30/375; 30/166.3; 125/13.03

(58) Field of Classification Search
USPC ............... 30/166.6, 370, 371, 374, 375, 376; 125/13.03
See application file for complete search history.

(56) References Cited

U.S. PATENT DOCUMENTS

| | | | | |
|---|---|---|---|---|
| 995,971 | A * | 6/1911 | Keyes | 30/370 |
| 1,530,886 | A * | 3/1925 | Gora | 30/377 |
| 1,568,328 | A | 1/1926 | French | |
| 1,764,111 | A * | 6/1930 | Manthey | 30/377 |
| 1,803,068 | A * | 4/1931 | McKeage | 30/390 |
| 1,806,528 | A | 5/1931 | Fegley et al. | |
| 1,813,693 | A * | 7/1931 | Balinski et al. | 30/370 |
| 1,942,766 | A * | 1/1934 | O'Banion | 30/391 |
| 1,975,191 | A * | 10/1934 | Calef | 452/149 |
| 3,034,493 | A * | 5/1962 | Bandy | 125/13.01 |
| 3,092,156 | A * | 6/1963 | Hayden | 30/371 |
| 3,896,783 | A * | 7/1975 | Manning | 125/13.01 |
| 4,022,182 | A * | 5/1977 | Lenkevich | 125/13.01 |
| 4,188,935 | A | 2/1980 | Tubesing | |
| 4,516,324 | A | 5/1985 | Heininger, Jr. et al. | |
| 4,685,214 | A | 8/1987 | Shearon et al. | |
| 4,856,394 | A | 8/1989 | Clowers | |
| 5,540,210 | A * | 7/1996 | Jones | 125/13.01 |
| 5,564,408 | A * | 10/1996 | Bassols | 125/12 |
| 5,579,753 | A * | 12/1996 | Chiuminatta et al. | 125/12 |
| 5,588,213 | A | 12/1996 | Swanberg | |
| 5,856,715 | A * | 1/1999 | Peot et al. | 310/50 |
| 6,112,736 | A | 9/2000 | Bearden | |
| 6,612,349 | B2 * | 9/2003 | Smith et al. | 144/136.95 |
| 7,163,010 | B2 | 1/2007 | Markley et al. | |
| 7,571,720 | B2 | 8/2009 | Donnerdal et al. | |
| 8,011,357 | B2 | 9/2011 | Johansson | |
| 8,146,258 | B2 * | 4/2012 | Shafer | 30/371 |
| 8,181,350 | B1 * | 5/2012 | Morin | 30/90.4 |
| 2002/0096166 | A1 * | 7/2002 | Halstead | 125/12 |
| 2009/0313831 | A1 * | 12/2009 | Patel | 30/123 |

* cited by examiner

*Primary Examiner* — Sean Michalski

(74) *Attorney, Agent, or Firm* — Jason H. Foster; Kremblas & Foster

(57) ABSTRACT

A supporting and stabilizing shoe used with a masonry circular power saw. A shoe frame rigidly mounts to the saw's motor frame. A plate that is preferably substantially planar and bifurcated to form two substantially co-planar members with a gap therebetween pivotably mounts to the shoe frame. A spring biases the plate away from the blade, but can be overcome, and an adjustment knob tightens the plate in position relative to the blade. This provides for depth adjustment for the blade and keeps the blade at a desired angle, such as ninety degrees, to the workpiece surface. The plate extends longitudinally from the motor frame beneath the drive mechanism and the blade of the saw to provide a stable surface upon which the saw can rest during use or storage.

26 Claims, 3 Drawing Sheets

US 8,898,913 B1

MASONRY CIRCULAR SAW STABILIZING AND SUPPORTING SHOE

BACKGROUND OF THE INVENTION

The invention relates generally to power tools, and more specifically to a supporting and stabilizing shoe for a masonry circular saw.

Hand saws have been used for centuries to cut wood and other materials. Hand saws require a user to manually move a blade in a reciprocating motion against a workpiece along a line, and this action divides a larger workpiece into smaller pieces. Because hand saws are gripped by the hand of a worker, they are designed to be controllable by the average person. In recent years power saws have been developed with a blade attached to a motor to drive the blade in rotary or reciprocating motion. Power saws allow a user rapidly to cut a workpiece, such as wood, metal, masonry or any other material, but are normally very heavy and/or large, thereby making them somewhat difficult to control.

Common power saws include chainsaws, which are typically used to saw wood to rough dimensions. Chainsaws include an internal combustion or electric motor mounted to a rigid frame and enclosed in a housing. An elongated, flat bar extends from the frame with a looped chain, driven by the motor, slidably mounted in a groove around the bar. There are also circular saws for masonry use, for example to cut stone, concrete or other masonry material. Such masonry circular saws, which include the STIHL brand model TS420 as an example, have an internal combustion engine mounted to a frame, housing and drive mechanism, much like a chainsaw. However, the drive mechanism mounts to a circular masonry blade, which can be diamond tipped, rather than a bar and chain.

It is necessary with any saw to drive the blade at a desired and consistent angle through the workpiece. Additionally, the blade is preferably maintained at a consistent depth in the workpiece during cutting. With a masonry power saw, controlling the angle and depth of the blade can be difficult because such saws are, like chainsaws, heavy and held by hand. Workers manually maintain the angle and depth of the blade in the workpiece, but this results in fatigue and injury.

The cutting blades of masonry power saws are spaced from the engine so that one holds the housing of the engine, and the blade is spaced from the housing away from the user. This configuration results in control over the masonry power saw that is similar to that of a typical chainsaw. For rough cutting of masonry, the conventional masonry power saw is sufficient. However, for precise cutting, the masonry power saw is difficult to control.

Wood-cutting circular saws commonly have blades mounted directly to the driveshaft of the motor, adjacent to the housing of the motor and not spaced from the motor. This enables a pivoting shoe to be attached to one housing end, extend beneath the housing around the blade, and attach at the distal housing end. This configuration provides a stable and strong support for the weight of the wood-cutting circular saw. Wood-cutting circular saws are often used for precise cutting of wooden workpieces.

It is thus known to attach a shoe to a saw that has a circular blade attached directly to the driveshaft of the motor that drives the blade, as shown in U.S. Pat. Nos. 6,112,736, 5,540, 210 and 4,022,182 for wood-cutting circular saws. However, to Applicant's knowledge no such shoe is known for masonry power saws, which have substantially different configurations than the typical wood-cutting circular saw.

BRIEF SUMMARY OF THE INVENTION

The present invention contemplates a shoe that removably mounts to, or is formed integrally on, a masonry circular saw to stabilize the saw laterally, longitudinally and vertically while sawing and while stationary. The combination of the shoe and the saw provides a stable tool during use or non-use. The removable shoe preferably attaches to the saw at the motor frame beneath the motor when the saw is in an operable orientation. The drive mechanism connecting the motor to the blade uses a chain, driveshaft, belt or other longitudinally-mounted structure to drive the blade.

The shoe includes a shoe frame mounted to the motor frame, and a pivot apparatus by which a plate connects to the shoe frame. The plate has cantilevered members that extend on both sides of the blade with a gap therebetween to permit the blade to extend between the cantilevered plate members. The thickness of the blade is less than that of the gap, thereby permitting the blade to protrude below the plate when the plate is pivoted upwardly towards the blade. The plate pivots along a spring-loaded hinge and can be locked up to a particular position to define the depth of the blade. When locked, the plate provides substantial vertical, lateral, and longitudinal (front-to-back) stability.

Figure 1:
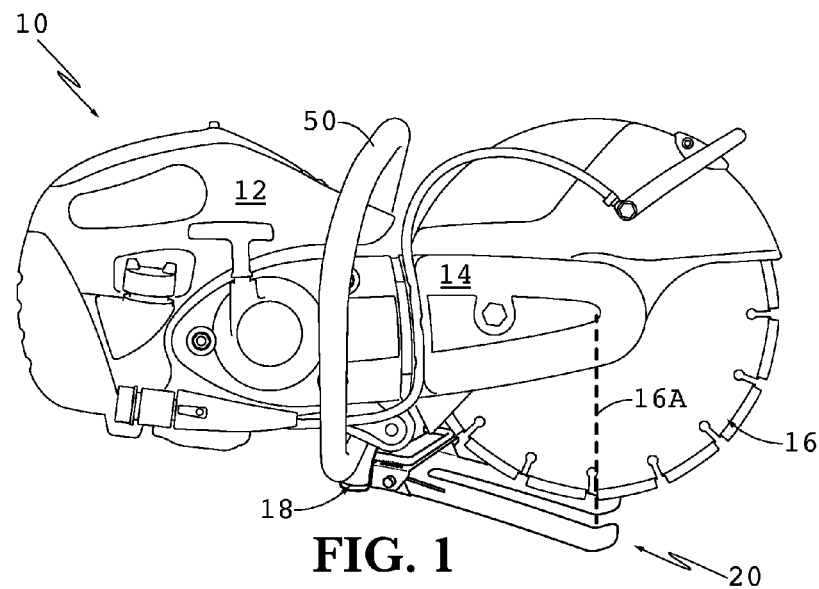
FIG. 1 is a view in perspective illustrating a convention masonry circular saw used in association with the present invention.
Figure 2:
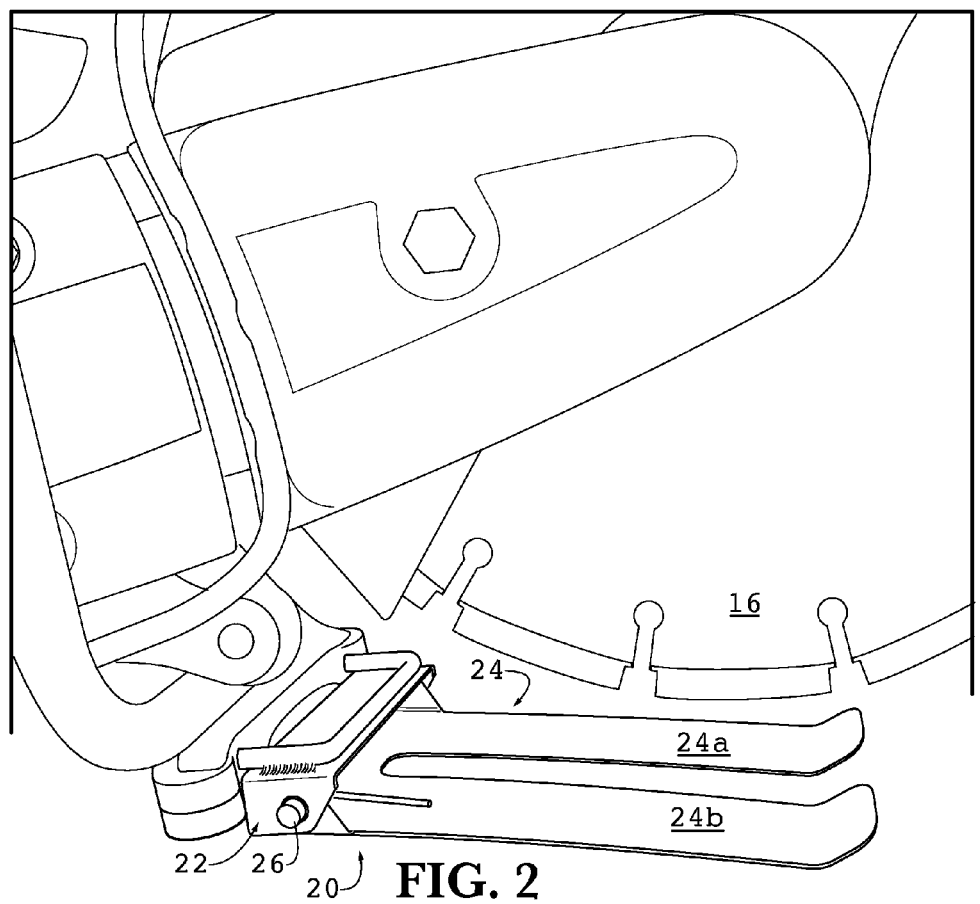
FIG. 2 is a right side view illustrating a preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In FIG. 1 a conventional masonry power saw 10 is shown having a housing 12, inside of which is a motor (not visible). The protective housing 12 is mounted to the motor in a conventional manner, and is disposed around the motor to protect the user from hot regions, such as the exhaust manifold, and shock from electrical components. A motor frame 18 is provided to mount the motor on a rigid structure, thereby allowing other structures to be mounted to the rigid motor frame 18, as is described below. The motor frame 18 extends at least below the motor in an operable orientation shown in FIG. 1, but can also surround part or all of the motor in the manner of a "cage".

A drive mechanism 14 attaches rigidly, or moveably, to the motor frame 18, and drivingly links the shaft of the motor to a circular blade 16. Thus, the motor drives the blade 16 in circular motion in a conventional manner. The drive mechanism 14 can include gears, pulleys, sprockets, a drive chain, a driveshaft, a drive belt, or any other suitable drive mechanism capable of driving the blade 16 in circular motion. The blade 16 is mounted to the drive mechanism 14 in a conventional manner, such as on an arbor, and rotates about an axis 16a spaced from the motor's driveshaft (motor driveshaft is not visible, but its location is conventional and is understood by a person of ordinary skill). The drive mechanism 14 extends longitudinally (along the longest dimension of the saw 10) from the motor to the blade 16. The blade 16 is thus disposed entirely to one longitudinally-directed side of the motor and housing 12, such that all portions of the blade are on one side of the driveshaft of the motor. When observing the saw 10, the motor, the drive mechanism 14 and the blade 16 are aligned along a line.

A shoe 20 is mounted to the motor frame 18 as shown in the illustrations in order to be able to rest the weight of the saw 10 on the shoe, which thereby rests upon a workpiece (not shown) or a support structure. A contemplated workpiece is a conventional masonry object, such as a concrete paver, block or header, or a stone or any other masonry item. The shoe 20 is used to rest the saw 10 on the ground, a table, a workpiece or any other structure that supports the saw 10 thereon so that the blade 16 maintains its preferably vertical orientation (given a horizontal surface) and maintains a consistent depth in the workpiece. The preferred embodiment allows a worker to rest the entire weight of the saw 10 on the workpiece, but during use the saw 10 is typically still supported by the worker as he or she maintains control and slides the saw across the workpiece. Thus, as much or as little weight as the worker sees fit to rest on the workpiece can be rested thereon.

Figure 3:
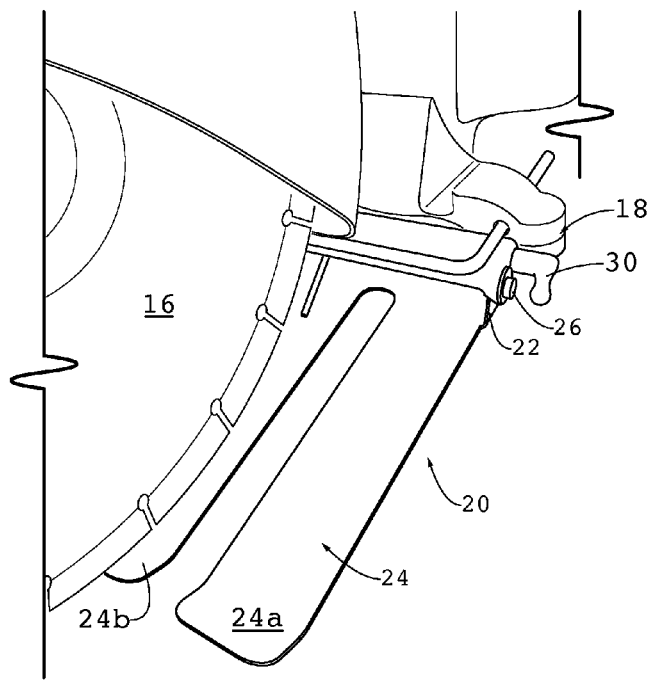
FIG. 3 is a left side view in perspective illustrating the embodiment of FIGS. 1-2.
Figure 4:
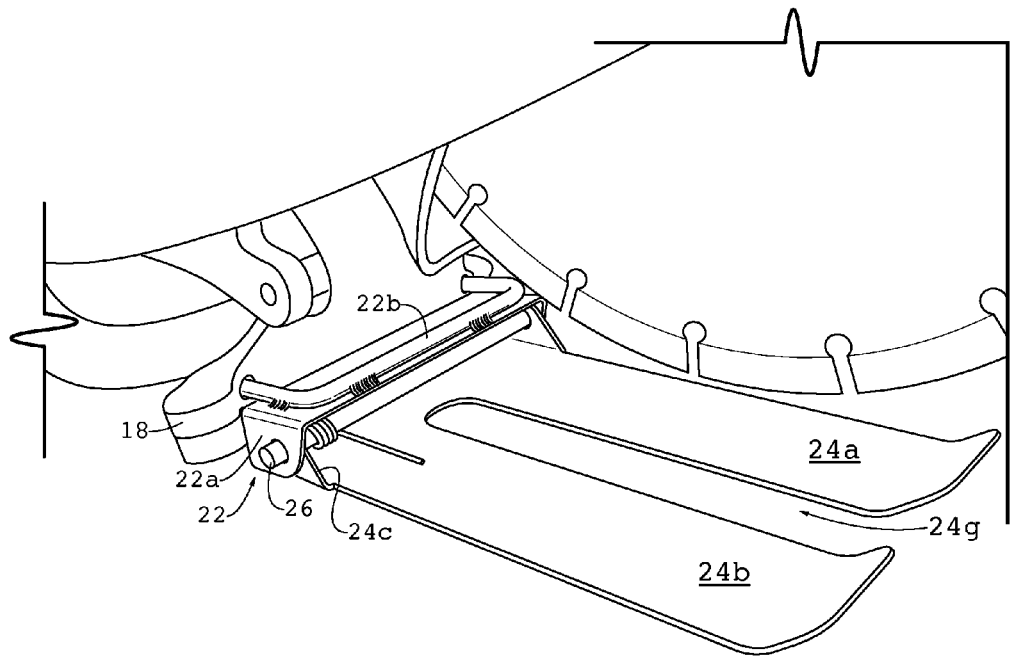
FIG. 4 is a front right side view in perspective illustrating the embodiment of FIGS. 1-3.
Figure 5:
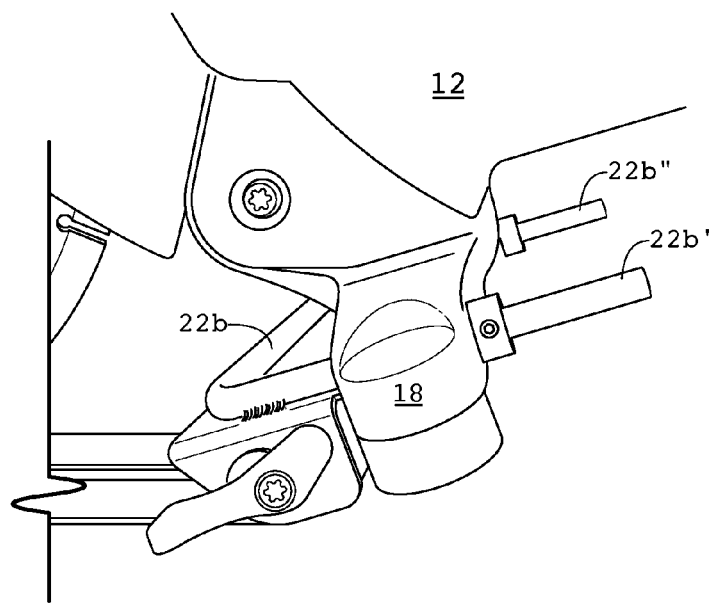
FIG. 5 is a side view illustrating the mounting apparatus of the embodiment of FIGS. 1-4.

As shown in FIGS. 2-6, the shoe 20 is made up of a shoe frame 22, a plate 24 and a pivot shaft 26. The shoe 20 is made of steel unless stated otherwise. Of course, the person of ordinary skill will understand that other materials, including other metals, fiber-reinforced polymer composites, polymers and ceramics, could be used in place of the preferred material with offsetting advantages and disadvantages. As shown in FIG. 4, the shoe frame 22 is attached, preferably by welding, at its upper end to a pin rod 22b. The pin rod 22b attaches to the motor frame 18 of the saw 10 by extending two pins 22b' and 22b" through openings in the motor frame 18, preferably below the motor, and adjacent the handle 50, when the saw 10 is in an operable orientation. The pins 22b' and 22b" have collars mounted thereon to prevent the pins from withdrawing through the motor frame 18, and the collars could be replaced by any equivalent structure if the pins were similarly modified. The pins could be threaded, for example, with nuts screwed on the pins. The frame 22 is thus mounted rigidly and, preferably, removably to the housing 12 and it will be apparent that other mounting structures are possible. The frame 22 also has downwardly-extending (in the orientation shown in the illustration of FIG. 4) members 22a at opposite ends.

The plate 24 has a pair of members 24c that extend upwardly (in the orientation shown in the illustration of FIG. 4) towards the shoe frame members 22a to receive the pivot shaft 26. The shaft 26 is preferably at least as long as the frame 22 so that the upwardly extending members 24c extend between the downwardly extending members 22a and the pivot shaft 26 extends through aligned holes in all members 22a and 24c. U-shaped fasteners 26a mount in circumferential grooves at the ends of the pivot shaft 26 to maintain the pivot shaft 26 in the position shown in FIG. 4, in which the frame 22 and the plate 24 can pivot relative to one another.

Figure 6:
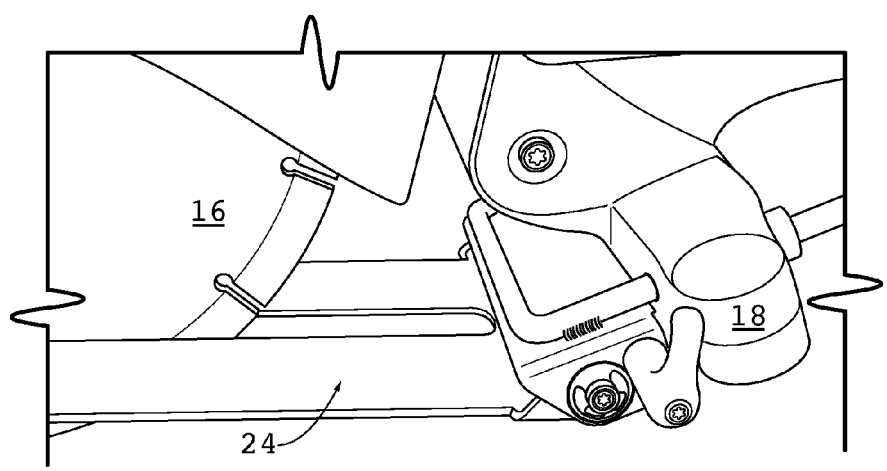
FIG. 6 is a left side view illustrating the embodiment of FIGS. 1-5 with the shoe tilted to permit greater depth of penetration by the blade.

The plate 24 extends from the frame 22 and pivot shaft 26 as two cantilevered members 24a and 24b with a gap 24g formed therebetween. The gap 24g is at least as wide as the thickness of the blade 16, and preferably is at least about twice, and preferably about ten times, the blade's 16 thickness. This permits the blade 16 to extend into the gap 24g, such as by pivoting the plate 24 upwardly as shown in FIG. 6, without the members 24a and 24b contacting the plate 24. The plate is preferably substantially the same width as the motor frame 18, thereby providing substantial lateral stability when the weight of the saw 10 rests on the plate 24.

As shown in FIG. 3, an adjustment knob 30 is mounted to a screw (not shown) that extends through aligned arcuate slots in adjacent ones of the downwardly extending members 22a and upwardly extending members 24c. The screw extends through the arcuate slots in the members 22a and 24c, and threads into the adjustment knob 30 so that, upon tightening the adjustment knob 30, the screw and adjustment knob 30 lock the adjacent members 22a and 24c together, preventing relative movement therebetween. This allows the plate 24 to pivot relatively freely before locking, preferably against a torsion spring (not shown) that extends coaxially around the pivot shaft 26 between the downwardly extending members 22a and applies a rotational bias on the plate 24 in the direction away from the blade 16.

When the adjustment knob 30 is loosened from the screw and the plate 24 is tilted about the pivot shaft 26, which compresses the spring that biases the plate 24, the knob 30 can then be tightened to lock the plate 24 in place as shown in FIG. 6. This provides a depth adjustment of the blade 16 when the blade 16 extends through the gap in the plate 24. The depth is determined by plate 24 position, whereas before tightening of the knob 30 the depth could be changed by simply pivoting the plate 24 against the spring bias. By locking the knob 30, blade depth is determined and fixed. Nevertheless, in both the locked and unlocked positions, the plate 24 provides lateral stability during cutting, to provide the blade cutting at 90 degrees to the surface of the material being cut.

In operation, the saw 10 can be operated in at least two methods. First, if the spring biasing the plate 24 away from the blade 16 has sufficient spring constant, a user can simply saw by resting the plate 24 and blade 16 on the workpiece. As the blade begins to cut into the workpiece, the plate compresses the spring as the worker allows the saw 10 to be lowered or pushes the saw down. If the deepest cut is preferred, the worker simply allows or forces the plate 24 to pivot as far as possible towards the blade until the plate 24 stops, such as by the spring fully compressing or by the shoe frame 22 and the plate 24 abutting one another. Then the saw is simply pushed or pulled along the workpiece to elongate the cut. During this operation, the lateral stability of the saw, and thus the angle of the blade 16 relative to the workpiece, is maintained by the plate 24 of the shoe 20. Any tendency of the saw 10 to tilt to one side or the other is met by substantial, correcting force due to the width of the plate 24 being substantially equal to the width of the motor frame 18. Thus, any tilting of the saw would cause the side of the plate 24 toward which the saw is tilted to act as a pivot point. This situation would increase the felt weight of the saw in the user's hands.

To reduce the felt weight, the user would simply allow the saw to be lowered so the plate 24 rests parallel to the workpiece surface.

The second method of operation, if the plate is desirably locked in a predetermined position to prevent the blade 16 from entering too far into the workpiece, the adjustment knob 30 is tightened when the plate 24 is pivoted to the desired location relative to the blade 16 (such as after measuring the amount of blade 16 protruding through the gap in the plate 24). Then the weight of the saw 10 rests upon the blade 16 and the back of the plate 24, with the user allowing the saw to lower as the blade cuts into the workpiece by pivoting about the back of the plate 24. This occurs until the blade reaches its maximum depth and the plate abuts the workpiece along the entire length and width of the plate 24. Then the worker pushes or pulls the saw 10 along the workpiece to form a cut in the workpiece the same depth. Because the knob 30 is tightened, the blade maintains the same depth during the entire cut.

During either method of cutting, the saw 10 is supported laterally due to the width of the plate 24, which is similar to the saw's width. Furthermore, the saw 10 is supported longitudinally by the plate 24, which extends from the motor frame 18 to beneath and past the axis 16a of the saw blade. Thus, the shoe 20 supports and stabilizes the saw 10 on the workpiece in every direction. Furthermore, if the plate 24 is positioned as shown in FIG. 1, and the knob 30 is tightened, the saw 10 can rest with the plate against the ground or a table upon which the saw sits, and the stationary blade does not rest on the supporting surface. The shoe 20 thus provides for a more stable tool during use and storage.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A pivoting support shoe for mounting to a saw having a rotary motor, a motor frame, a drive mechanism and a circular blade, wherein the motor, the drive mechanism and the blade are aligned longitudinally, the shoe comprising:
(a) a shoe frame for mounting the shoe to the motor frame;
(b) a plate pivotably attached to the shoe frame, the plate having first and second substantially coplanar members with a gap therebetween that is thicker than the blade, the first and second members extending from attachment to the shoe frame towards the blade as cantilevers with the blade substantially aligned with the gap so that upon pivoting of the plate towards the blade, the blade becomes interposed between the first and second members.

2. The shoe in accordance with claim 1, wherein the shoe frame further comprises a pair of elongated pins for extending into the motor frame.

3. The shoe in accordance with claim 2, wherein the pins are configured to extend through the motor frame adjacent a hand-grippable handle.

4. The shoe in accordance with claim 2, wherein the pins further comprise fasteners on a side of the motor frame opposite the shoe frame.

5. The shoe in accordance with claim 2, wherein the pins are configured to mount to the motor frame below the motor when the saw is in an operable orientation.

6. The shoe in accordance with claim 1, wherein the plate is configured to extend beneath the drive mechanism when the saw is in an operable orientation.

7. The shoe in accordance with claim 6, wherein the plate is configured to extend from the motor frame past an axis of rotation of the blade.

8. The shoe in accordance with claim 1, wherein the shoe further comprises an adjustment knob for rigidly affixing the plate to the shoe frame.

9. The shoe in accordance with claim 1, wherein the shoe further comprises a spring that biases the plate away from the blade.

10. An improved saw having a rotary motor, a motor frame, a drive mechanism and a circular blade, wherein the motor, the drive mechanism and the blade are aligned longitudinally, the improvement comprising:
(a) a shoe frame mounted to the motor frame;
(b) a plate pivotably attached to the shoe frame, the plate having first and second substantially coplanar members with a gap therebetween that is thicker than the blade, the first and second members extending from attachment to the shoe frame towards the blade as cantilevers with the blade substantially aligned with the gap so that upon pivoting of the plate towards the blade, the blade becomes interposed between the first and second members.

11. The improved saw in accordance with claim 10, wherein the shoe frame further comprises a pair of elongated pins extending into the motor frame.

12. The improved saw in accordance with claim 11, wherein the pins further comprise fasteners on a side of the motor frame opposite the shoe frame.

13. The improved saw in accordance with claim 11, wherein the pins are mounted to the motor frame below the motor when the saw is in an operable orientation.

14. The improved saw in accordance with claim 11, wherein the pins extend through the motor frame adjacent a hand-grippable handle.

15. The improved saw in accordance with claim 10, wherein the plate extends beneath the drive mechanism when the saw is in an operable orientation.

16. The improved saw in accordance with claim 15, wherein the plate extends from the motor frame past an axis of rotation of the blade.

17. The improved saw in accordance with claim 10, wherein the shoe further comprises an adjustment knob for rigidly affixing the plate to the shoe frame.

18. The improved saw in accordance with claim 10, wherein the shoe further comprises a spring that biases the plate away from the blade.

19. A method of using a saw having a rotary motor, a motor frame, a drive mechanism and a circular blade, wherein the motor, the drive mechanism and the blade are aligned longitudinally, the method comprising:
(a) mounting a shoe frame to the motor frame;
(b) pivotably attaching a plate to the shoe frame, the plate having first and second substantially coplanar members with a gap therebetween that is thicker than the blade, the first and second members extending from attachment to the shoe frame towards the blade as cantilevers with the blade substantially aligned with the gap; and (c) pivoting the plate towards the blade, thereby interposing the blade between the first and second members.

20. The method in accordance with claim 19, wherein the step of mounting the shoe frame to the motor frame further comprises extending a pair of elongated pins into the motor frame.

21. The method in accordance with claim 20, further comprising extending the pins through the motor frame adjacent a hand-grippable handle.

22. The method in accordance with claim 20, wherein the step of mounting the shoe frame to the motor frame further comprises mounting fasteners to the pins on a side of the motor frame opposite the shoe frame.

23. The method in accordance with claim 19, wherein the step of mounting the shoe frame to the motor frame further comprises extending a pair of elongated pins through a portion of the motor frame that is below the motor when the saw is in an operable orientation.

24. The method in accordance with claim 19, further comprising extending the plate beneath the drive mechanism when the saw is in an operable orientation.

25. The method in accordance with claim 24, further comprising extending the plate from the motor frame past an axis of rotation of the blade.

26. The method in accordance with claim 19, further comprising rigidly affixing the plate to the shoe frame by tightening an adjustment knob.

* * * * *